Aug. 6, 1957 T. C. KORSMO Re. 24,343

TOGGLE

Original Filed Aug. 11, 1954 6 Sheets-Sheet 1

INVENTOR

Torbjorn C. Korsmo

BY

ATTORNEYS

TOGGLE

Original Filed Aug. 11, 1954 6 Sheets-Sheet 2

INVENTOR
Torbjorn C. Korsmo

BY Dodge Ellis & Ivers

ATTORNEYS

TOGGLE

Original Filed Aug. 11, 1954 6 Sheets-Sheet 3

INVENTOR
Torbjorn C. Korsmo

BY Dodge, Ward & Smith
ATTORNEYS

TOGGLE

Original Filed Aug. 11, 1954 6 Sheets-Sheet 4

INVENTOR
Torbjorn C. Korsmo

BY Dodge & Olds Inc

ATTORNEYS

TOGGLE

Original Filed Aug. 11, 1954 6 Sheets-Sheet 5

INVENTOR
Torbjorn C. Korsmo

BY Dodge Ward Sons

ATTORNEYS

TOGGLE

Original Filed Aug. 11, 1954 6 Sheets-Sheet 6

INVENTOR
Torbjorn C. Korsmo

BY Dodge and Sons

ATTORNEYS

United States Patent Office

Re. 24,343
Reissued Aug. 6, 1957

24,343

TOGGLE

Torbjorn C. Korsmo, Madison, Wis., assignor to Madison-Kipp Corporation, Madison, Wis., a corporation of Wisconsin Original No. 2,708,372, dated May 17, 1955, Serial No. 449,096, August 11, 1954. Application for reissue April 10, 1957, Serial No. 652,077

16 Claims. (Cl. 74—110)

Matter enclosed in heavy brackets [ ] appears in the original patent but forms no part of this reissue specification; matter printed in italics indicates the additions made by reissue.

This invention relates to toggle mechanisms. Specifically it relates to a toggle mechanism in which the to and fro motion of the movable member carried and controlled by the toggle is not limited by the length of the back link of the mechanism.

Force multiplying toggle mechanisms are well known and have found many applications in the press art. While the present invention is particularly suited to use in the die casting industry, its use is by no means limited to this application.

The toggle mechanism according to the present invention comprises an adjustably positioned crosshead which supports two idler pinions which are carried by spaced parallel shafts. The axes of these shafts are transverse to the direction of motion of the movable platen which is mounted between the adjustable crosshead and the stationary platen. To and fro movement of the movable platen is controlled by a double-acting motor which is connected thereto by means of a linkage. This linkage comprises tumbling links connected to the piston rod and a front link pivotally connected to each tumbling link and to the movable platen. The connection between the front link and the platen is such that sliding movement of the pivot transverse to the direction of motion of the platen is afforded. The front link has a rack on its outer face which engages the idler pinions carried by the adjustable crosshead. This rack includes a long straight section and an arcuate rear section.

When the press is open the pivots between the front link and the platen are in retracted central position and the tumbling links are parallel with the motor piston rod and react in thrust relation against the front links. Movement by the motor toward the stationary platen causes corresponding movement of the movable platen. During initial movement of this platen, the pivots between the front link and the platen are caused to move outward to their operating position. As the pivots reach their outermost positions the tumbling links start to tumble and urge the other ends of the front links outward. This outward movement occurs while the arcuate portions of the racks are engaged with the pinions. The pinions at this time serve as the back links of the toggle mechanism and the desired force multiplication is achieved. In the fully closed position the axis of each pivot between the front link and the platen is alined with a corresponding pinion axis and with the point of contact between a corresponding rack and pinion.

In order to prevent overloading the teeth of the racks and pinions coacting cam surfaces are provided between the rack and pinion. Coaction between their surfaces occurs as the press approaches its closed and locked position and serves to separate slightly the pitch lines of the rack and pinions.

It will be apparent that the toggle of the present invention is similar in some respects to wedge toggles, but it has the important advantage that rotary cam surfaces replace the sliding wedge surfaces. This eliminates the high static friction which must be overcome to open a wedge toggle. The idler pinions afford compact back links and rotate in timed relation to toggle movement at all times so that the shafts which carry them may be used to time other operations carried out during opening and closing of the press.

The invention will be better understood by reference to the accompanying drawings, in which.

Figures 1, 2:
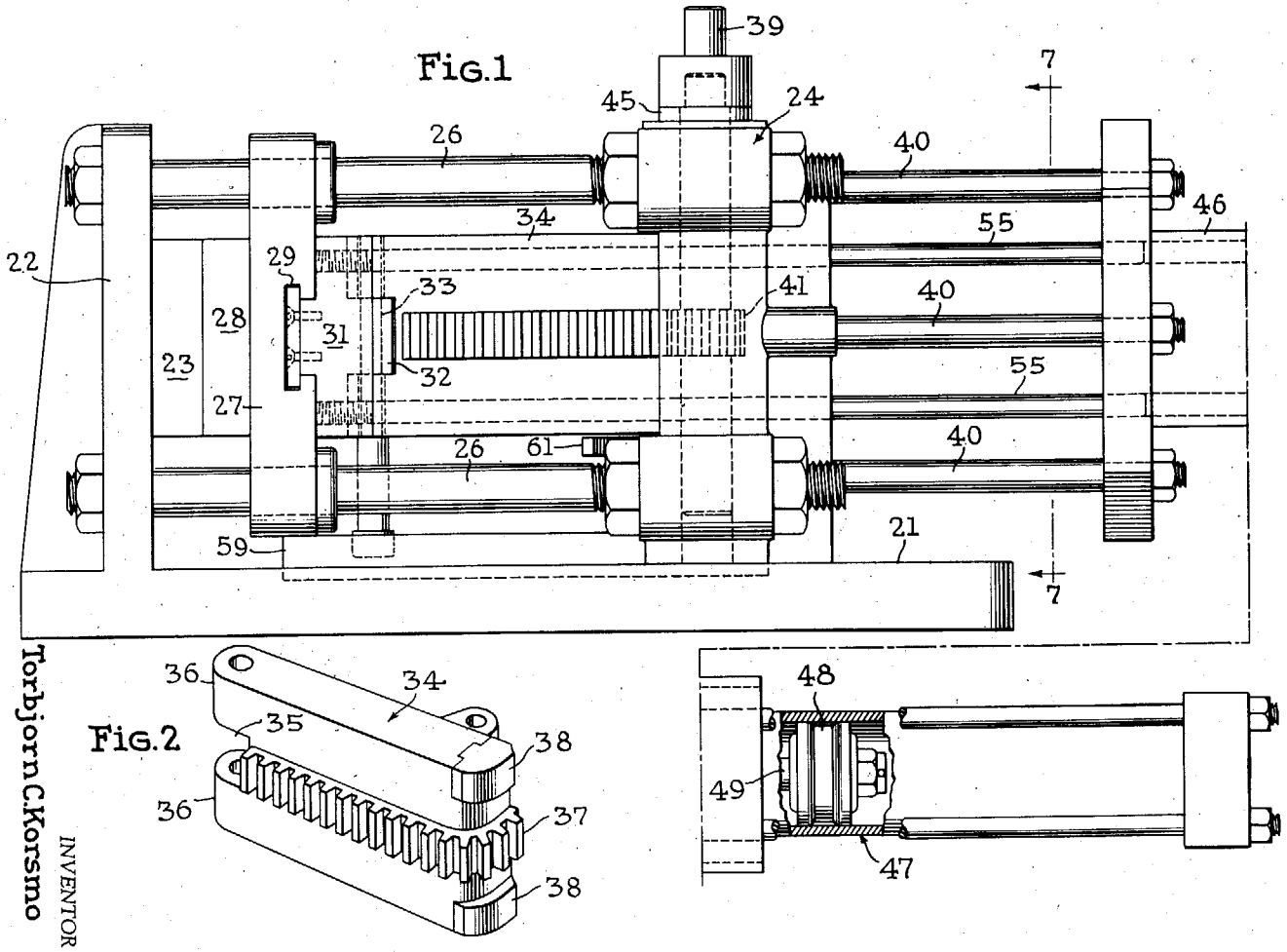
Figure 1 is a side elevation of a press embodying the invention.
Figure 2 is a detail perspective view showing one of the front toggle links.
Figure 3:
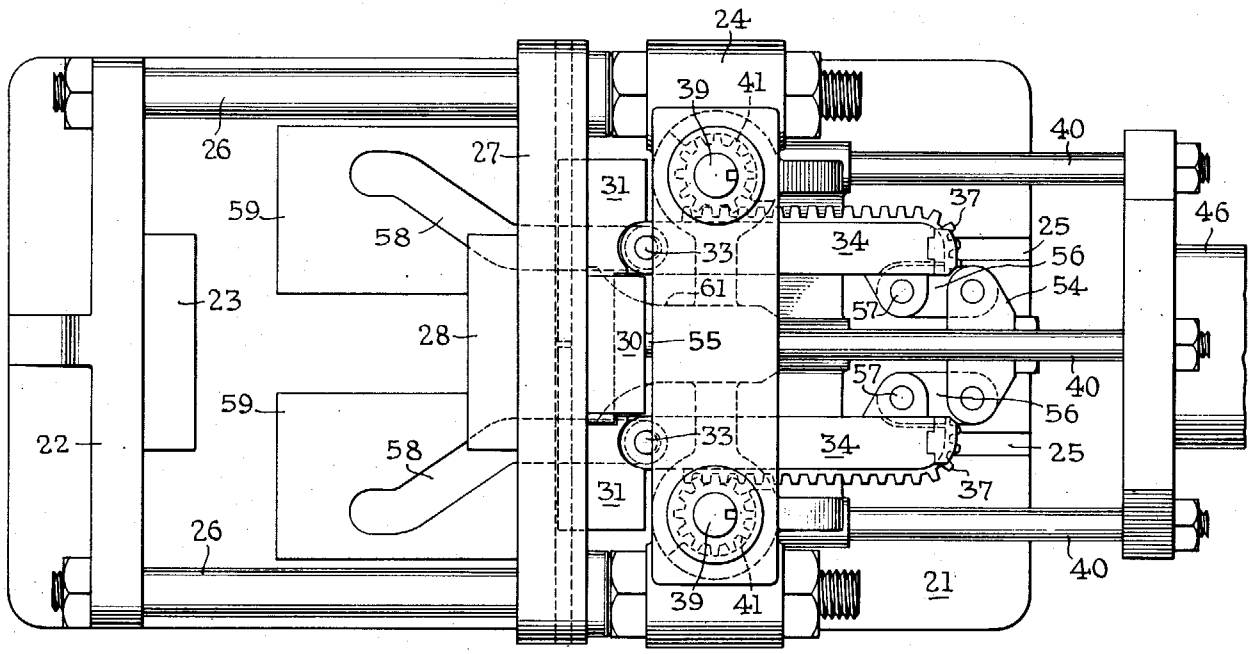
Figure 3 is a top plan view of the press in its open position.

Refer first to Figure 1. The die casting machine there shown comprises a bed plate 21 having a vertical stationary platen 22 connected thereto. Platen 22 sustains a die half generally indicated at 23. Slidable on the bed plate 21 is a main crosshead 24 which is guided during sliding movement by the ways 25, see Figures 3 and 5. Guide bars 26 extend between the platen 22 and the main crosshead. The outer ends of the guidebars 26 are threaded and sustain nuts which are arranged to react against opposite faces of the crosshead 24 to secure it in its adjusted position. A movable crosshead or platen 27 is also sustained by the guidebars 26, and it carries a second die half 28. Formed in the rear face of platen 27 is an undercut groove or guideway 29 in which two hinge blocks 31 are reciprocable. A generally U-shaped guide block 30, located at the center of the rear face of platen 27, receives the inner ends of two blocks 31 which overlap one another when the blocks are retracted, see particularly Figure 3.

The hinge blocks are provided with projecting bosses 32 which receive the hinge pins 33. On each side of the boss 32, the hinge block is provided with an arcuate bearing surface. Hinged to each block 31 is a front link 34. One of the links 34 is best shown in Figure 2. The forward end of the link 34 is forked as shown at 35. The bosses 32 are received therein and secured by pins 33. The holes in the lugs 36 on links 34 are oval so that, when loaded, the arcuate faces on either side of bosses 32 carry the load by engaging these lugs 36. A rack or gear segment 37 of the contour shown in provided on the outer face of the link 34. Camming surfaces 38 are provided adjacent the arcuate portion of the rack 37.

Figure 4:
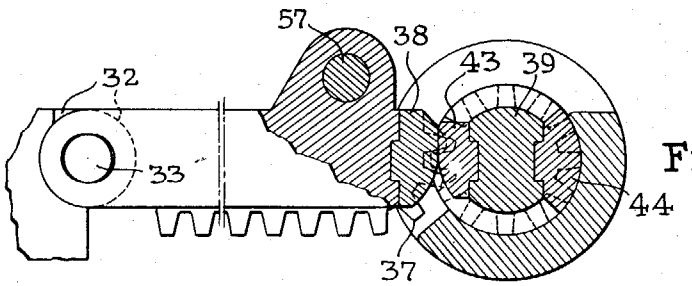
Figure 4 is a detail view partly in section, showing the cooperation between the forward link and the pinion in the closed position of the press.
Figure 8:
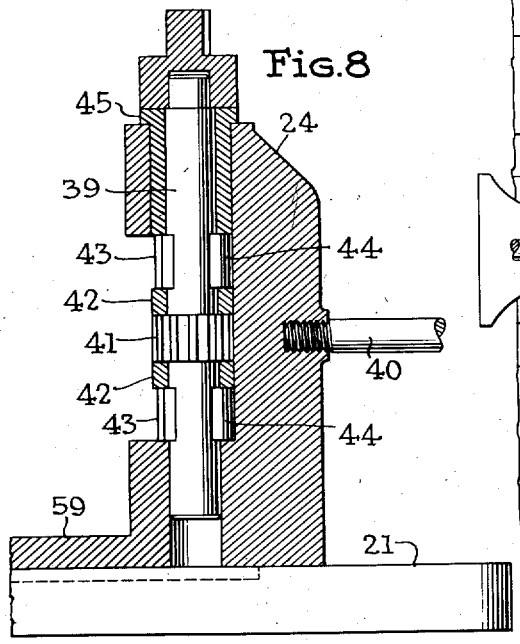
Figure 8 is a detail view partly in section showing the pinion mounting.
Figure 9:
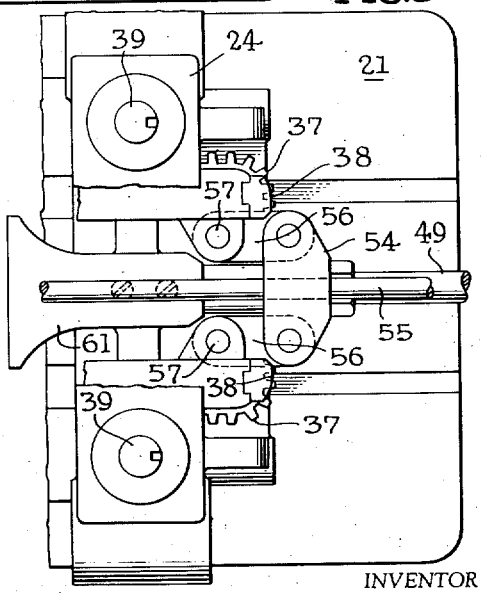
Figure 9 is a detail view showing the positions assumed by the parts just prior to outward movement of the outer ends of the forward links.

Journalled in the main crosshead 24 are two shafts 39 each of which has a pinion 41 keyed thereto. See particularly Figure 8. On either side of each pinion 41 is bearing bushing 42. As shown in Figure 4, cams 43 are fastened to shafts 39, there being one cam adjacent each bearing bushing. To the diametrically opposite side of the shafts 39 are attached spacers 44. Bushings 45 are provided in the main crosshead 24 (Figure 8). The cam surfaces 38 and 43 appear to coincide with the pitch lines on the rack and pinion, actually their radii are slightly greater than the pitch radii.

Figures 5, 6:
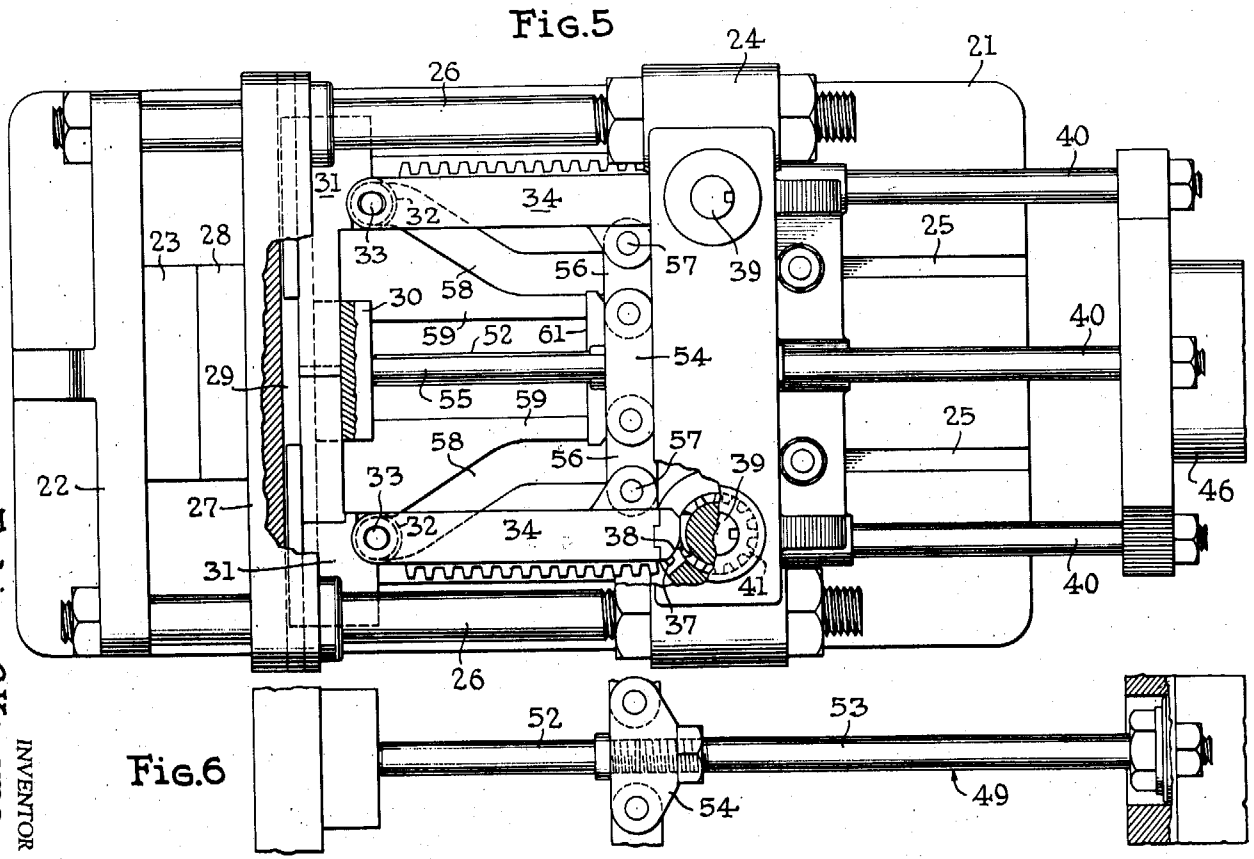
Figure 5 is a top plan view partly in section showing the press in closed position.
Figure 6 is a fragmentary view partly in section showing a detail of construction.
Figure 7:
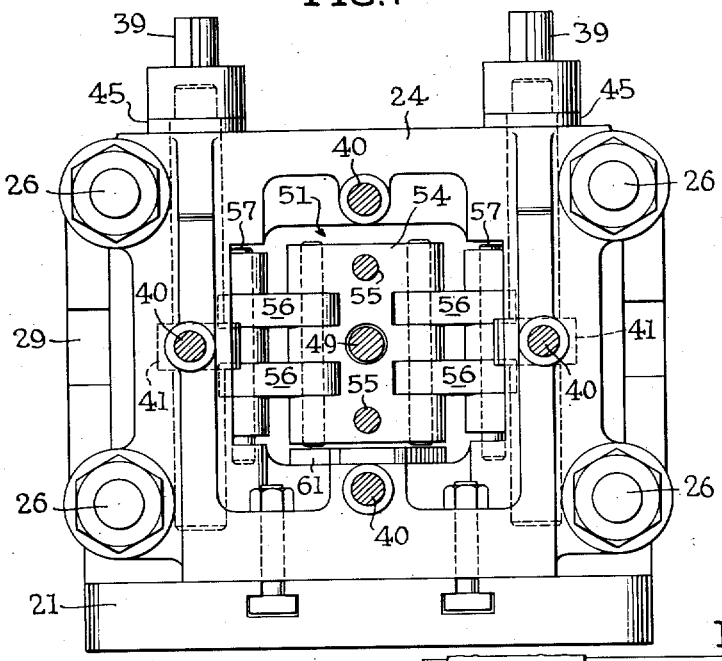
Figure 7 is a sectional view taken on the line 7—7 of Figure 1.

Four sustaining rods 40 extend rearward from the crosshead 24 and sustain the flanged cylinder head 46 of a double-acting motor 47. Attached to the motor piston 48 is a piston rod 49 which is aligned with the rectangular opening 51 in the crosshead 24. As shown in Figure 6 the piston rod is made in two sections 52 and 53 which are threaded into cross-member 54. The forward end of the section 52 is spaced from the guide block 30 except in the closed position of the mechanism.

Two guide members 55 are attached to and extend between the guide block 30 and the flanged cylinder head 46. The cross-member 54 is guided thereby. Hingedly interconnecting the front link and the cross-member 54 are tumbling links 56. The pins 57 which interconnect links 56 and front links 34 project beyond the lower face of link 34 and are arranged to be moved outward by cam 61, see Figures 3 and 5. Cam slots 58 are formed in horizontal extensions 59 of the crosshead 24 and are engaged by extensions of the pins 33. Slots 58 control lateral movement of the hinge blocks 31. Cam 61 assures initial outward movement of pins 57.

Referring now to the embodiment illustrated in Figurges 10, 11, 12, similar parts are identified by reference numerals to which 100 has been added. Reference numerals higher than 170 have no counterpart in the other embodiment. The two embodiments are in the main identical, the difference being the manner of causing and controlling lateral motion of the hinge blocks 31 and 131.

Figure 10:
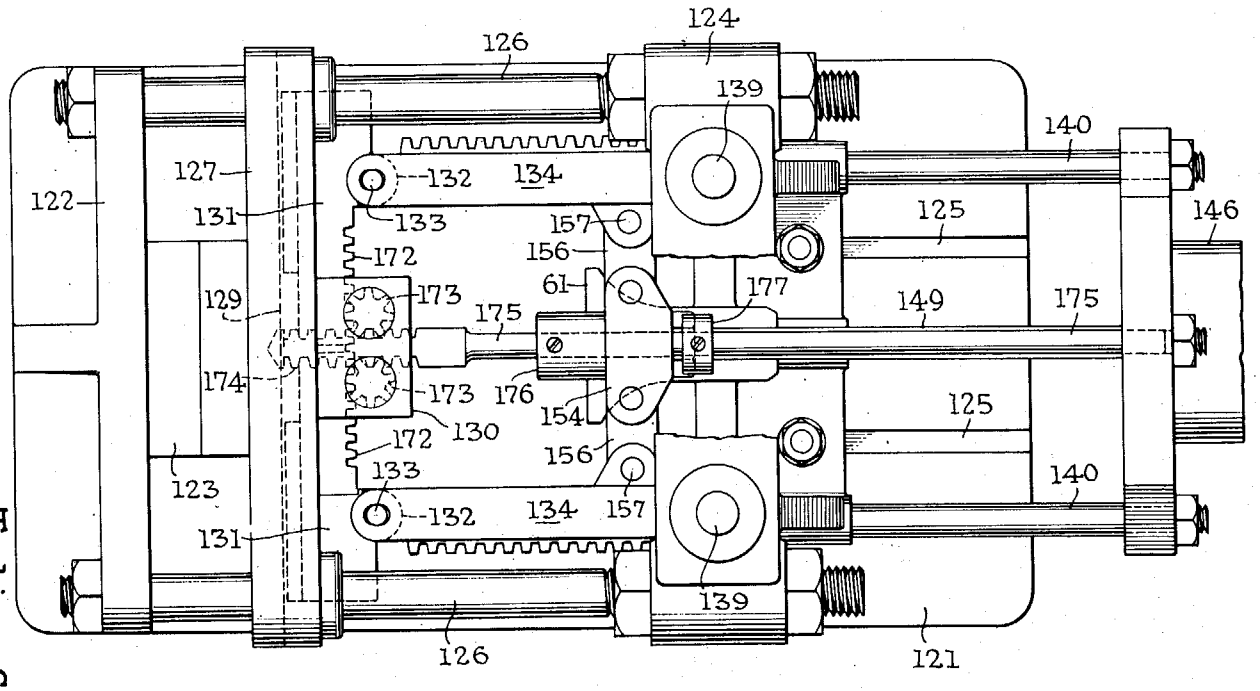
Figure 10 is a top plan view of a modified form of the invention.
Figure 11:
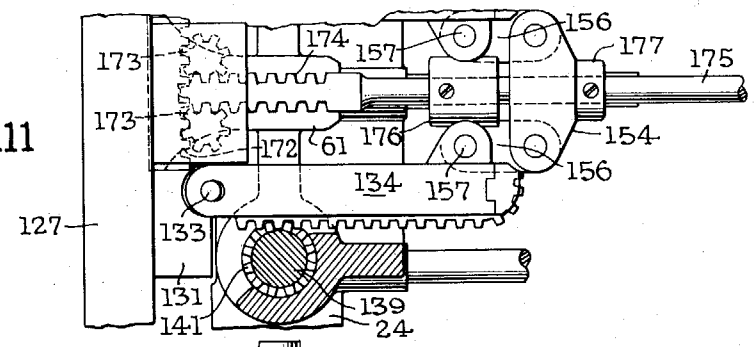
Figure 11 is a detail view partly in section showing the parts in the open position of the machine of Figure 10.

Mounted on the rear face of platen 127 is a guide block 130. The block 130 is provided with a central guideway 171 which embraces opposite sides of the overlapping inner ends of the hinge blocks 131. As shown in Figures 10 and 11, racks 172 are formed on the edge faces of the hinge blocks 131 and are engaged by pinions 173 mounted on a shaft carried in the hinge blocks 131. The pinions 173 are in turn engaged by a rack 174 formed on rod 175 carried by the cross-member 154. The rod 175 is free to slide a controlled amount in the member 154. This sliding motion is limited by collars 176 and 177. A spring 178 reacts between the collar 176 and cross member 154 and biases the member 154 against collar 177 except when the die halves are closed. The outer ends of rods 175 are guided in the cylinder head 146 of the motor (not shown).

The operation of the device will be generally apparent from the description of the parts. Closing movement of the die press commences with the parts in the positions shown in Figure 3, i. e., with the hinge blocks 31 retracted and the tumbling links 56 generally parallel to the piston rod 49. As the platen 27 moves forward, pins 33 are engaged by the divergent portions of cam slots 58, which causes the blocks 31 to move laterally outward. As the pins 33 reach the outer parallel portions of slots 58, the pins 57 are engaged by the cam 61 and links 56 are rotated outward. Outward movement of the end links 56 is accompanied by outward movement of rearward ends of links 34, which at this time engage the pinions 41 along the arcuate portions of racks 37. As outward movement continues the cam surfaces 43 and 38 engage one another with substantially rolling contact. The cam surfaces are arranged to separate the pitch lines of the racks and pinions, thus transferring the load to the cam surfaces as the links 56 reach the limit of their motion. In this position the axis of pins 33 and shaft 39 lie in a common plane which also includes elements of the cam surfaces 38 and 43 which lie in the flat portions thereof, see Figure 4. As the links 56 reach the limit of their motion the section 52 of the piston rod 49 strikes the guide block 30 and thus augments the closing force exerted by the toggle mechanism.

It is important to notice during both opening and closing movement of the press the racks 37 and pinions 41 are engaged causing rotation of shafts 39. It will be seen that rotation of shafts 39 has a constant timed relationship to motion of the movable platen 27. This timed rotary motion of shafts 39 can be used to control the operation of auxiliary apparatus used in the die casting or pressing operation.

Figure 12:
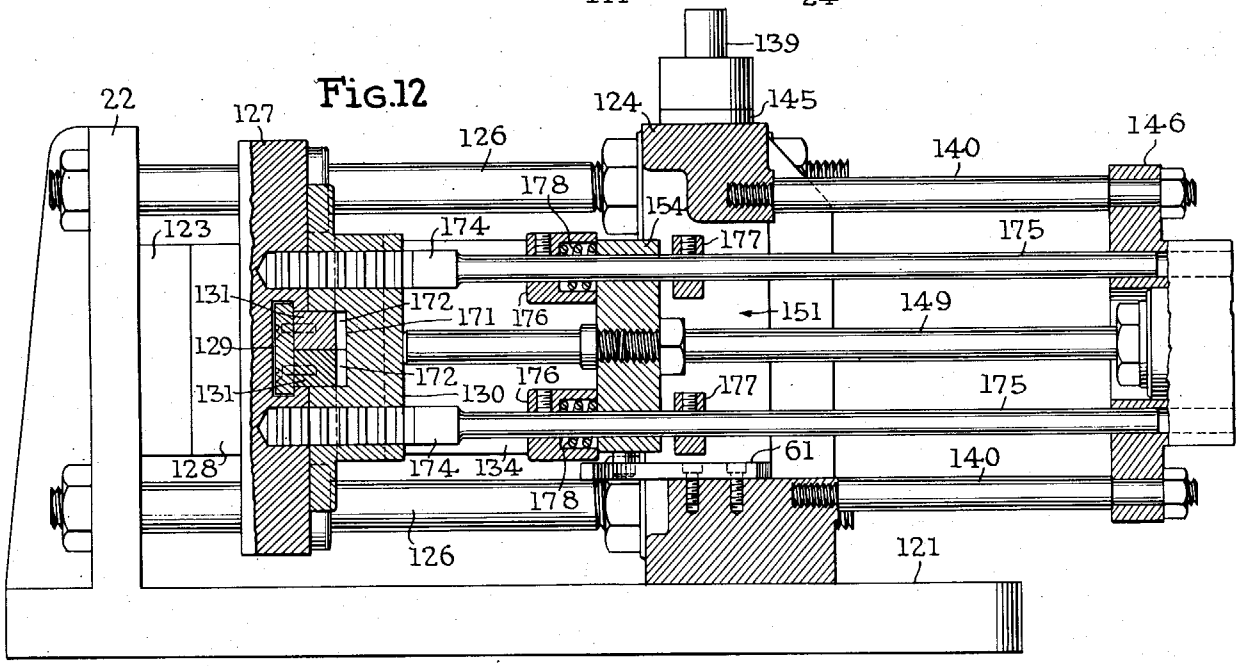
Figure 12 is a side elevation partly in section of the machine shown in Figure 10.

Operation of the embodiment shown in Figures 10, 11 and 12 is substantially identical with that already described except that outward movement of the blocks 131 is controlled by interengagement of the racks 174 and 172 and pinions 173. It will be apparent that outward movement of the hinge blocks 131 is commenced when forward motion of the movable platen 127 is arrested by closure of the die halves. The continuing forward movement of the rack 174 causes rotation of the pinions 173 in opposite directions whereby the hinge blocks 131 are moved outward. Movement of the links 156 occurs at the same time. During the final outward movement of the rearward ends of links 134, the hinge blocks 131 will have reached the limit of their motion. Spring 178 is then compressed and continued movement of piston rod 149 causes it to strike the guide block 130 and assist in forcing the die halves closed.

It will be seen that the linkage motion on opening of the dies in either embodiment is the reverse of closing movement.

In their open position the forward links are retracted from the outer edge of the movable platen and lie close together. In this way it is possible to draw the links backward through the central opening in the main crosshead, whereby substantially the entire interval between the main crosshead and the movable platen is available for opening movement of the press. In conventional linkages the pivots 33 and 133 are fixed and limit the opening movement of the die halves even in toggle linkages in which there is an automatically released back link or those in which the back link is replaced by a wedging surface.

The rolling contact between the cam surfaces 38 and 43 is an important feature of the invention, as it permits a greater closing force to be exerted without creating excessive friction forces. It also contributes to the easy opening of the press, because the force required to cause this rotary motion is notably less than the forces required to overcome the static friction forces between the wedge surfaces.

The use of a gear train to time motion of the two cam surfaces is advantageous because of its simplicity as contrasted to automatically releasable hook members.

The elimination of the back link of the toggle and the two pivots associated therewith is itself an advantage, because it ensures sustained accuracy of adjustment even after long periods of use. The present linkage has many of the advantages of a wedge type toggle, but is not subject to the disadvantage of high friction forces and consequent low force multiplication.

It should be noted that the cam tracks 58 and the motor 47 are both fixed relatively to the crosshead 24. Hence they move therewith when it is adjusted so that different sized dies may be used in the machine. This means that the toggle linkage once properly adjusted need not be readjusted when different dies are used.

The lost motion provided between the rods 175 and the cross-member 154 assures that final movement of the tumbling links during closure of the dies occurs after the hinge blocks 131 have reached their limiting position. In this way high friction forces need not be overcome to move the blocks 131 to their extreme positions. Similarly the load on the hinge blocks 131 is partially relieved during opening movement of the dies before the hinge blocks are retracted.

I claim:

1. A toggle mechanism comprising a support having guides; a fixed carrier mounted on said support; a reciprocable carrier guided on said support to move toward and from said fixed carrier; an actuator reciprocably guided on said support to move in a path alined with that of the reciprocable carrier; a pair of front links; a pair of shiftable connectors guided on the reciprocable carrier in paths transverse to the reciprocation path of the carrier, each connector being hinged to one end of a corresponding front link; shifting means reacting against said shiftable connectors and serving to move them toward and from each other as the carrier reciprocates; tumbling links hinged to the swinging ends of respective front links and to said actuator, the effective length of said tumbling links corresponding with the range of transverse motion of corresponding shiftable connectors; and means affording back links, one for each front link, comprising rack teeth on each front link the pitch line of said teeth extending along the side of the link and curving so as to extend across the swinging end thereof, and a pair of toothed pinions each pinion meshing with the rack teeth of a corresponding front link, said pinions turning in bearings on said support on axes parallel with each other and with the hinge axes of the tumbling links and of said shiftable connectors.

2. The combination defined in claim 1 in which thrust surfaces approximating the pitch lines in the pinion and on the swinging end of the front link are mounted on said parts and serve to limit the meshing engagement of the teeth.

3. The combination defined in claim 1 in which said shifting means are fixed cams carried by the support, and cam followers carried by the shiftable connectors.

4. The combination defined in claim 1 in which the actuator overtakes and engages the reciprocable carrier at the limit of the latter's approach to the fixed carrier.

5. The combination defined in claim 1 in which the actuator overtakes and engages the reciprocable carrier at the limit of the latter's approach to the fixed carrier and the tumbling links then being alined and perpendicular to the front links.

6. The combination defined in claim 1 in which said shifting means comprises a toothed rack formed on each shiftable connector; two pinions each engaging one of said toothed racks and carried by the movable carrier; and a member connected with said actuator and having two racks formed thereon, one engaging each of the pinions carried by said movable carrier and serving to rotate said pinions in directions to cause motion of said shiftable connectors in opposite directions.

7. A toggle mechanism for opening, closing and locking a movable platen press comprising in combination; a support, a reciprocable platen guided thereon and a fixed platen; hinge members carried by and transversely slidable on the reciprocable platen; reciprocable actuating means; a thrust linkage reacting between said means and said members and including front links hingedly connected at one end to said members, and tumbling links each having one end connected with said means and the other end pivotally connected with a corresponding front link; a rack formed on a lateral face of each front link, said rack including a straight portion and an arcuate portion adjacent the swinging end of the link; pinions carried by said support and each engaged by one of said racks and rotatable about an axis transverse to the direction of movement of said platen; means serving during closing of the press to move said hinge members outward from an initial position to a limiting position; and a cam carried by the support and reacting against the tumbling links and arranged to cause tumbling motion of said links, said cam being effective, when said members move to said limiting position, to rotate said front links to a locking position in which the axis of rotation of the pinion, the line of contact between said racks and pinions and the axis of the hinge connection are substantially coplanar.

8. Opening and closing means for movable platen presses comprising in combination two hinge blocks carried by the movable platen and slidable transversely thereof; a double-acting motor; a thrust linkage reacting between said motor and said hinge blocks, said linkage including two front links and at least two tumbling links, each tumbling link being pivotally connected at its opposite ends with a corresponding front link and with said motor, the other end of each of said front links being pivotally connected with a corresponding hinge block; a crosshead adjustably positioned relatively to the fixed platen and having a central opening through which said linkage extends, said motor means being carried by said crosshead; a rack formed on a lateral face of each front link, said rack including an arcuate portion at the swinging end of the front link, two spaced pinions carried by said crosshead and rotatable about an axis transverse to the direction of motion of the platen, each pinion engaging a corresponding rack; guide means effective to move said hinge blocks apart to a final position during closing movement of the press; a cam effective, after said blocks move to their final position, to cause tumbling motion of the tumbling links whereby said arcuate portions of the racks are engaged by the pinions and the lines of contact therebetween are caused to move away from each other to a position in which they are coplanar with the pinion axis and the axis of the connection between the front links and the hinge blocks; and a thrust member extending between said platen and said motor and spaced therefrom prior to tumbling of the links by a distance slightly less than the projected distance between the pivots of the tumbling links measured in the direction of motion of the platen prior to tumbling of the links.

9. The combination defined in claim 8 and coacting camming surfaces formed adjacent said pinions and said racks and serving to separate the pitch lines of the racks and pinions, when the tumbling links are arrested by engagement between said thrust member, the motor means and the movable platen.

10. The combination defined in claim 9, including bearings in said crosshead; and shafts carried by said bearings, said shafts having said pinions fixedly mounted thereon, whereby said shafts rotate in timed relation to movement of said platen.

11. In a press of the type including a bed-plate, a fixed platen secured thereto and a guided movable platen reciprocable thereon, a toggle mechanism comprising in combination a crosshead carried by the bed-plate and adjustable relatively thereto; a double-acting piston motor sustained by said crosshead, said crosshead having an opening therein through which the piston rod of said motor extends toward said movable platen; a linkage reacting in thrust between said piston rod and said movable platen and including tumbling links pivotally connected with said piston rod, and two front links pivotally connected with said tumbling links, and two hinge blocks carried by said movable platen and slidable thereon in a direction transverse to the reciprocating movement thereof, said blocks being pivotally connected to said front links; a rack formed on a lateral face of each front link and having an arcuate portion extending around the swinging end thereof; two pinions carried by said crosshead and rotatable on a transverse axis, said pinions engaging said racks, said hinge blocks having racks formed thereon; rack means connected with the piston; a pinion carried by said platen and engaging the rack means and the racks formed on said hinge blocks and serving, when movement of the movable platen is arrested, to move said hinge blocks apart; and a cam engaging said tumbling links during separating movement of said hinge blocks, whereby said front link is moved to a position in which the arcuate portion of the rack formed thereon engages its corresponding pinion and in which position the axis of rotation of the pinions, the lines of contact between these pinions and the racks formed on the front links, and the axis of the pivots between the hinge blocks and the front links are substantially coplanar.

12. The combination defined in claim 11; and a lost-motion connection between the motor and the rack means connected therewith, said lost motion permitting said piston rod to complete the tumbling motion of the links after the hinge blocks have reached the limit of their outward movement.

*13. In a movable platen press of the type including a press bed, and platens movable relatively to each other and carried by said bed, said motion being reciprocatory and guided by the bed, a toggle mechanism comprising in combination, a support carried by said bed; an actuator for one of the platens carried by said support and reciprocable in a path aligned with the path of movement of that platen; a pair of fulcrum blocks carried by that platen and guided to slide thereon transversely to the path of that platen's movement; means to shift said blocks toward and from each other as an incident to reciprocation of that platen; a pair of thrust links, each link pivotally connected at one end with a corresponding fulcrum block; a tumbling link connected between the swinging end of each thrust link and said actuator, the effective*

*length of the tumbling links corresponding with the range of transverse fulcrum block movement; and reaction surfaces carried by said bed and each arranged to be engaged by the swinging end of a corresponding one of the trust links when the platens reach the limit of their approach toward one another.*

*14. The combination defined in claim 13 in which the means to shift said fulcrum blocks comprises fixed cams carried by the support and cam followers carried by the shiftable fulcrum blocks.*

*15. The combination defined in claim 13 in which the means to shift the fulcrum blocks comprises a toothed rack formed on each fulcrum block; two pinions, each engaging one of said toothed racks and carried by the corresponding platen; and two rack means formed on said actuator, one of said rack means engaging each of the pinions and serving to rotate said pinions in directions to cause motion of said fulcrum blocks in opposite directions.*

*16. The combination defined in claim 13 in which the actuator overtakes and engages the corresponding platen at the limit of its approach toward the other platen, the tumbling links then being aligned and perpendicular to the thrust links.*

No references cited.